RE 25616

June 19, 1962     O. M. STANLEY     3,039,783
SUPERMARKET CART

Filed Sept. 22, 1959     3 Sheets-Sheet 1

INVENTOR.
Oscar M. Stanley
BY
Curtis, Morris & Safford
ATTORNEYS

June 19, 1962  O. M. STANLEY  3,039,783
SUPERMARKET CART

Filed Sept. 22, 1959  3 Sheets-Sheet 2

INVENTOR.
Oscar M. Stanley
BY
Curtis, Morris & Safford
ATTORNEYS

June 19, 1962 O. M. STANLEY 3,039,783
SUPERMARKET CART
Filed Sept. 22, 1959 3 Sheets-Sheet 3
Fig. 8
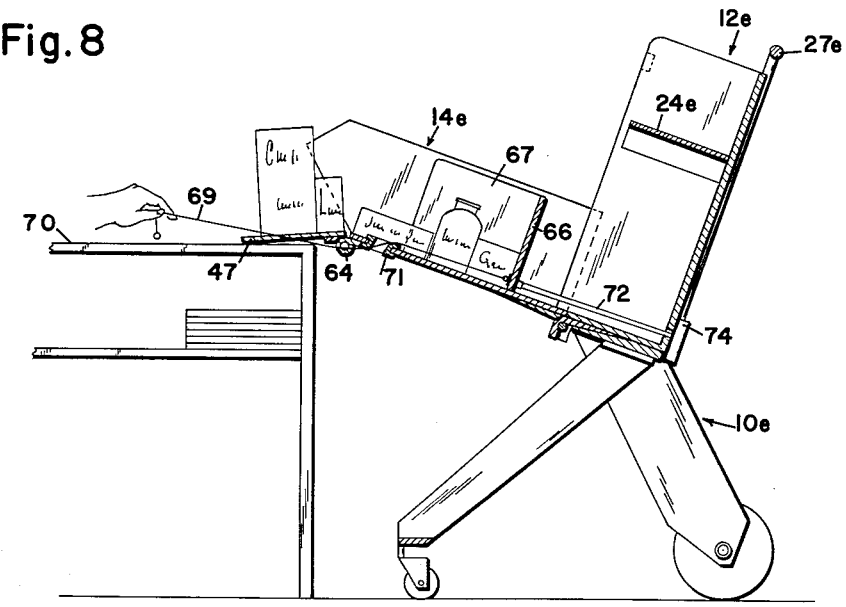
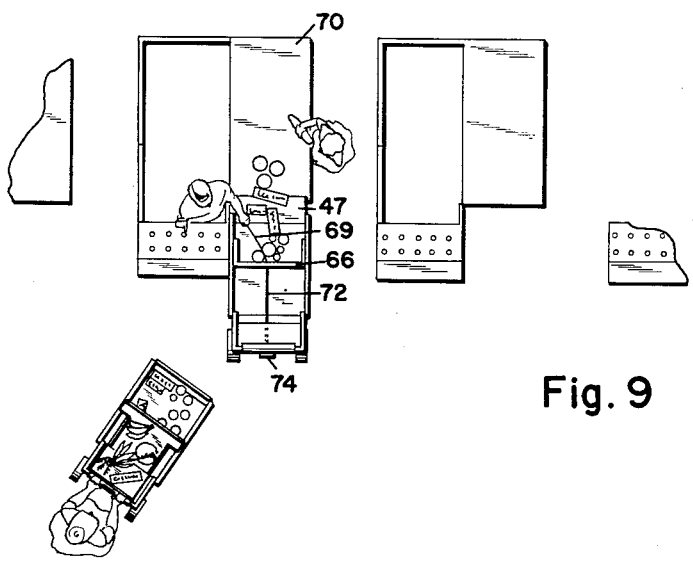
Fig. 9
INVENTOR.
Oscar M. Stanley
BY
Curtis, Morris & Safford
ATTORNEYS

United States Patent Office 3,039,783
Patented June 19, 1962

3,039,783
SUPERMARKET CART
Oscar M. Stanley, 370 1st Ave., New York, N.Y.
Filed Sept. 22, 1959, Ser. No. 841,501
12 Claims. (Cl. 280—33.99)

This invention relates to carts and more particularly to tote carts commonly used by grocery stores, etc., for collecting articles from various locations and carrying them to another or other locations where they are unloaded. In grocery stores, especially supermarkets, and in factories, such carts are now an important item of equipment. The box or basket or like receptacle is ordinarily made of woven wire so as to hold articles which are to be carried, but with open mesh coarse enough to allow dirt and other extraneous matter to sift through for self-cleaning, and especially to allow a clear view of the inside of the receptacle through its walls.

A relatively large number of such carts are ordinarily parked in one place ready for use, and withdrawn one at a time as required, and are returned to the "pool" when use is completed. In order to save space, it has become customary to make the receptacle of a tapered shape with a large opening at the back closed by an inwardly swinging gate, and to make the carriage part of the cart of such form and dimensions that the front part of one can be received in the rear part of another, at the same time that the smaller end of the receptacle pushes through the larger end of a receptacle on an adjacent cart with which it is being "nested." The gate at the larger end of the receptacle is thus swung up out of the way by the pressure of the smaller end of the receptacle on the nesting cart.

Carts nested in this way can be parked with economy of space and if the carts are nested and removed by movement parallel to the axis of the basket, and so long as the baskets are not deformed, the parking and removal of the carts is adequate. If, however, one of the carts, having been taken out to an auto parking lot as often happens, is crushed or bent to some extent by a backing automobile, or if one cart is pushed into another from an angle or, if after proper nesting, the caster wheels of one cart are turned at an angle, then the baskets may jam in one another and separation of the carts may become a difficult problem.

The present invention provides an improved cart which can be parked with economical use of available space, and avoid jamming together of one cart when nested with another, and also to provide an attractive appearance and provide for better and more economical operation.

To overcome the previously experienced difficulties, it has been suggested heretofore to pivotally mount the receptacles so that they can be turned with open face forward or backward, in which case the baskets can remain truly rectangular at their open face and taper only from it to the bottom. The nesting required is then substantially less than with the type of nesting carts referred to above, and the change of jamming is greatly reduced by the relatively smaller depth of insertion and by a greater angle of taper which is possible because of the relatively small depth in which the taper is required.

The present invention does not require the nesting of one receptacle into another, but instead provides for the receptacle to be extended open on top for reception of articles when in use, and to be folded up into the body of a cart with a minimum space requirement when the cart is parked.

An important feature of the cart embodying the present invention is its ability to fold itself by merely being pushed against an abutment, which may be a wall, if it is alone or at the head of a line of carts to be parked, or which may be another similar cart to be parked if it is being added to a line.

Another feature of the invention is the ability to park in a single line, carts of different sizes or having different features of shape and function. Because each cart folds into itself, it is not necessary, as it has been with carts now in common use, to have all of a single standard size and design. Thus, I am able to embody a child's seat in one cart, shelves and various arrangements in other carts; some carts can be narrower or have smaller receptacles if a small volume of goods is to be carried and one wishes the greater maneuverability of having a small cart, while other carts may be substantially wider with relatively larger receptacles. Some may have deeper receptacles than others which will cause them to occupy somewhat greater space in a line of parked empty carts, but does not prevent other carts of other sizes from being compactly parked in the same line. Likewise, if one wishes to select a particular cart from the middle of a line of parked carts, the line may be separated and the cart removed from the central position, and the others can then be pushed back together again. This ability to use together carts of different sizes and designs is also important to the manufacturer who supplies the carts, as it permits him to continually improve his product as improvements appear to be desirable; whereas, with the old nesting carts, such improvements are hampered because they may require a complete replacement of all such equipment if any improved cart is desired. Likewise, from the point of view of the user, if he has purchased some carts which are not entirely satisfactory, it is not necessary to throw them away, but he can purchase an improved model and "stack" them in the same line.

Other features and advantages of the invention of great importance will appear from the following description and the accompanying drawings.

In the accompanying drawings are shown several preferred embodiments of the invention to be described below. These are selected and presented here to illustrate the principles of the invention and the best manner of embodying for practical use. They are not intended to be exhaustive of the invention, but, on the contrary, to so explain and instruct others with regard to the invention, that they may be enabled to modify and substitute within the scope of the invention so as to embody it in a form best adapted to the conditions of each particular use.

In the drawings:

FIGURE 3 is a fragmentary view in vertical section of the upper part of a cart similar to that shown in FIG. 1 and the center of FIG. 2, but having chain stops for supporting the shelf 32 and the back of the infant's seat.

FIGURE 4 is a fragmentary oblique view in vertical section, showing the hinge construction of said baby seat and shelf of FIGS. 1 and 2.

FIGURE 5 is an isometric view of the hinge used between the body and receptacle of FIGS. 1 and 2.

FIGURE 8 shows a modified cart, with end delivery being unloaded at a checkout counter. The counter and the operator's hand are shown in side elevation and the cart in vertical section.

FIGURE 9 is a plan view corresponding to FIG. 8 but on a smaller scale, showing a cart being unloaded at a checkout counter and another cart waiting to come up to the counter, with a row of parked carts at a distance.

Figure 1:
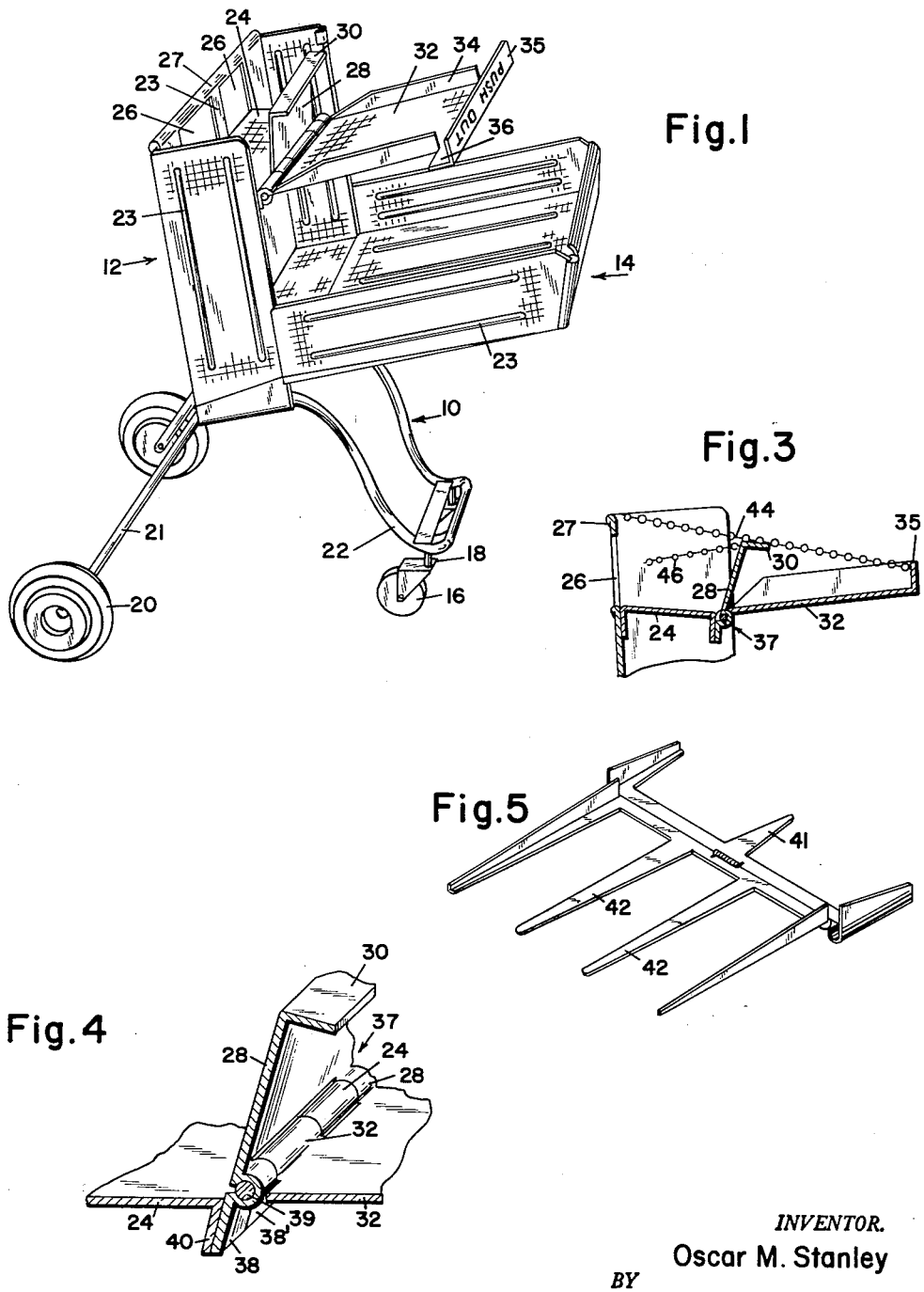
FIGURE 1 is a perspective view of a cart embodying my invention with the shelves and receptacles opened out ready for use, and a baby seat also open for carrying an infant.
Figure 2:
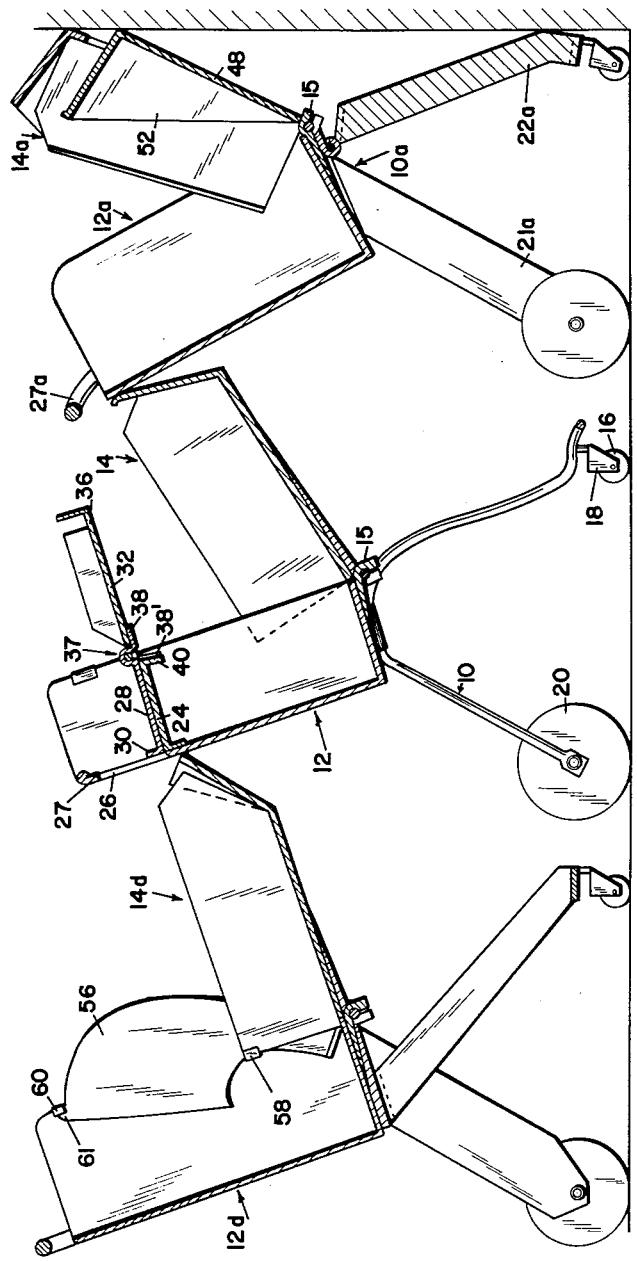
FIGURE 2 is a view in longitudinal vertical section of a line of three carts in process of being pushed together for compact parking. The middle one of these carts is of the type shown in FIG. 1 but with the back of the baby seat pushed down into position where it forms a shelf and a gate in leg openings of the back.

Referring to FIGURES 1 and 2, the cart shown comprises a carriage portion having a frame 10, in this case made of bent tubing, a body 12 secured thereon and a receptacle 14, foldably mounted in the body.

The carriage in this case is made with two front wheels 16, caster-mounted as indicated at 18, and two rear wheels 20, mounted on fixed stub axles at the ends of spaced legs 21 of the frame 10. It should be understood that my invention is not limited to this particular arrangement of wheels. For example, a tricycle carriage having one caster and two fixed wheels or one fixed wheel and two casters, could be used; and there are advantages in having the casters closer to the handle by which the cart is guided while the fixed wheels would then be on the forwardly projecting stabilizer part 22 of the frame.

As shown, the front portion 22 of the frame is narrower than the rear, and the width of the part 22 and the spacing of the casters 18 is such that they are readily received between the wheels 20 and the legs 21 at the rear of the frame 10 of a like carriage, and advantageously with enough extra width so that the casters have room to roll a little and swing into parallel relation when one cart is pulled out from another.

It is also possible to use a folding carriage, e.g., as illustrated by that shown at the right of FIGURE 2 wherein the divergent legs 21a at one end of the frame receive the narrower end of the frame 22a between them when it is folded back on its hinge. This carriage arrangement is also adapted for parking the wheels at one end on one cart between the wheels at the other end of the next cart.

The body 12, as shown in FIGS. 1 and 2, is advantageously made of sheet metal, at the back and on the sides, preferably having reinforcing ribs 23, those in the back providing sliding abutments for "stacking" the carts, as will be later described.

In the case illustrated by FIG. 1, a shelf 24 extends across the interior of, and reinforces, the body; and above this shelf two holes 26 are cut out of the back of the body leaving ribs 23 on the back with edge portions rolled back to complete a tubular section providing strength and smooth edges. At the top these rolled back parts constitute tubular hand grips 27. Openings 26 are designed to allow an infant seated on the shelf 24 to hang his legs through the back and down on the outside. Thus, the rolled edges avoid danger of cutting or scratching the infant's skin. Similarly, the edge of the shelf 24, at the openings, should be smooth and preferably rolled or radiused.

The bottom of the receptacle 14 and the shelves 24 and 32 are advantageously provided with many openings through which dirt can fall for self-cleaning and through which one can see the contents of the shelf or receptacle. This may be woven wire, or wires, or other strips, overlaid and spot-welded at crossing points, or advantageously, sheet metal pierced and stamped with ribs 23 of curved cross section (rigidized) for greater strength, as illustrated on FIGURE 1. The openings in such material are advantageously made small enough so that a child cannot push its fingers through, or large enough so that a child's finger could not become caught in it. For the same reason, it is advantageous not to have such openings in the sides or, at least, not to have openings large enough for a child's finger to extend through in such a way that it could be pinched or cut if the receptacle were folded up while the finger was thus projecting.

Hinged to the forward edge of the shelf 24 (e.g. as shown in FIG. 4) is an angular gate member 28 which, in the position shown in FIGURE 1, serves as a back-rest for an infant seated on the shelf 24, but is adapted to be swung over to the position shown in FIGURE 2 in which its angular web 30 blocks the openings 26, and the back-rest portion 28 lies flat against the shelf 24. In this position, it provides an auxiliary receptacle for small articles.

An extension shelf 32 is also shown hinged to the shelf 24. This has lateral flanges 34 to hold articles thereon and a front flange 35 cooperating therewith. The latter, as shown, projects at 36 beyond the lateral flanges 34, so that when the receptacle 14 is folded to its uppermost position, these lateral projections 36 will be engaged by the sides of the receptacle 14 whereby the shelf 32 will be thus folded to its uppermost position.

As shown in FIGURES 1–4, the receptacle 14 and the shelf 32 and the back-rest 28 have limited swinging movement by virtue of the construction of the hinges 37 by which they are mounted. If this hinge construction is not convenient or not rugged enough, or in general, if one wishes to use a different pivotal mounting which does not have limited pivotal movement, suitable extraneous stop means may be provided. This is illustrated in FIGURE 3 by two chains 44 and 46 secured between the sides of body 12 and the upper lateral edges of flanges 35 and 30, respectively. Other means to this end may be chosen by those skilled in the art. For example, the hinge 37 may be made, as shown in FIG. 4, with tongues 38, 38' extending downward from the hinge pin 39 and respectively integral with gate member 28, and shelf 32. These tongues engage against flange 40 integral with shelf 24. The hinge loops, as shown, are integral respectively with shelf 24, shelf 32 and gate member 28.

Instead of having the hinge integrally formed on the parts 24, 28, 32, it may of course be separate, e.g., as shown in FIG. 5. The long fingers 41, 42 by which the hinge is secured to the shelves 24 and 32 will also reinforce these shelves. As shown, this hinge does not provide for a gate member 28 but it will be understood that such member, if desired, can be mounted on upstanding members of the hinge corresponding to the members 28, 38 in the integral hinge structure of FIG. 4.

In FIGURE 2 are shown three carts being pushed together for compact parking. One of the virtues of my invention is illustrated here by the fact that these are three different types of carts, yet they are readily pushed together, the body of each folding into itself. Compact parking is not dependent upon the shape or dimensions of the cart in front, provided only that it affords an abutment against which the receptacle of the next cart behind it can be pushed to fold it up. The respective carriages are, of course, made so that the front wheel of one can be pushed between the rear wheels of the next, or vice versa.

As shown in FIG. 2, the front cart has been pushed against a wall which, serving as an abutment, has swung the receptacle 14a upward about its hinge and partly into the body portion 12a. The next cart in line has its receptacle 14 engaged against the body 12a but not yet swung up. Upon being pushed further, it will engage the projections 36 and then swing the shelf 32 upward with it, eventually folding them into the body 12.

In all of these carts, the hinge or pivot axis between the receptacle 14 and the body 12 is near the bottom front corner of the body and the rear bottom corner of the receptacle, whereas the forwardmost point of the receptacle is near its top; and, when the receptacle is in its operating position, i.e., extended more or less horizontally, the forwardmost point is substantially above the level of the hinge axis. Thus, when the cart is pushed againsnt an abutment, by a horizontal force applied to the cart, the reaction produces a turning moment about the hinge axis; and thus the horizontal push results in swinging the receptacle 14 upward into compact interfitting relation with the body 12.

The angle or curve at which the outermost end of the receptacle 14 slopes forward is, advantageously, such that, when it is pushed against a vertical abutment surface, the outermost point of contact will always be high up on the end of the receptacle until the receptacle itself has swung above the level of the hinge axis. Advantageously the point of contact is at progressively higher level as the receptacle is lifted to progressively higher angles. More specifically, the back of the body 12 of each cart constitutes an abutment slide engaged by the forward end of the receptacle 14 of the next adjacent cart to cam the receptacle upwardly; and said abutment slide on the back of each cart extends upwardly at a forwardly directed acute angle to a line through the forwardly projecting end of the receptacle and hinge axis when the receptacle is down against said stop means. In the embodiment illustrated in FIGURE 2, the abutment slide extends rearwardly of the cart at an angle to the vertical less than the angle which is complementary to the angle the upwardly sloping receptacle makes with the horizontal when the carts initially engage.

Figure 6:
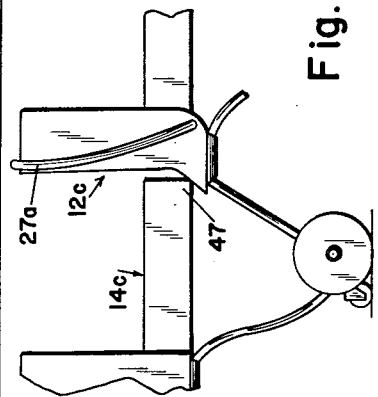
FIGURE 6 is a view in side elevation showing two carts of a modified construction, being pushed together for compact parking.

If, for any reason, it is not convenient to use the sloped front as represented in FIGURES 1 and 2, a square front on the receptacle can be used, as shown in FIGURE 6, if a suitable abutment surface is provided to cam the bottom corner upwards. This is illustrated by the back of the forward cart 12c, as shown in FIGURE 6, which engages the end 47 of the receptacle 14c of the cart behind it. When this expedient is used, a similar but fixed abutment may be provided on the wall at the parking position, so that, when the first cart is pushed into place, its receptacle will be cammed up in the same manner. Other mechanical devices for changing a horizontal push into upward motion, or a moment about the hinged pivot, may be used as will be clearly apparent to those skilled in the art.

The carriage frame used in this FIGURE 6 is similar to that of FIGURE 2, but a separate tubular handle 27a is secured to the body as shown instead of the integral grips 27.

In cases where this is not convenient and it is not convenient to have the front of the receptacle sloping outward, one may have the receptacle itself limited to stop in a position in which it slopes upward at a substantial angle, and a bottom pan 48 of the receptacle may be made to drop relative to the sides so that it provides a substantial horizontal bottom. The first cart in the line shown in FIGURE 2 is of this type; but, as the receptacle 14a has been moved to its upright or folded position, the drop-bottom 48 has been pushed into the receptacle by the horizontal push against the wall acting as an abutment.

When the receptacle of this cart is folded down ready for use, the sides of the receptacle 14a stop at an upward angle of about 20° and the drop-bottom pan 48, having triangular sides 52, also about 20°, drops down to a horizontal position, whereby its side flanges and a corresponding flange on its end engage cooperating flanges, or other abutments, on the inside walls of the receptacle 14a. In this position, the sides of the receptacle 14a plus the sides 52 and the end of the drop-bottom pan 48 provide a relatively deep receptacle. Because of the upward slope of the extended receptacle 14a, its end is high enough above the hinge 15 so that horizontal pressure against an abutment produces a substantial turning moment which will cause the receptacle 14a to swing upward and bring the end of the drop-bottom pan 48 against the abutment, whereupon it will be pushed up into the receptacle portion 14a; and thus the cart is compactly folded for storage by a simple horizontal push.

The cart just described also differs from the second cart in the line shown in FIG. 2, previously described, in that it has a tubular handle at 27a, separate from the body structure instead of the integrally formed handle grips 27. Also, in this instance, instead of the tubular carriage frame 10 extending forward to carry the casters, a formed metal frame is used, as shown, with the forward stabilizer leg 22a being hinged to the central portion of the remainder of the carriage frame 10a so that it can be folded back between its own rear wheels for compact storage as a single unit.

Figure 7:
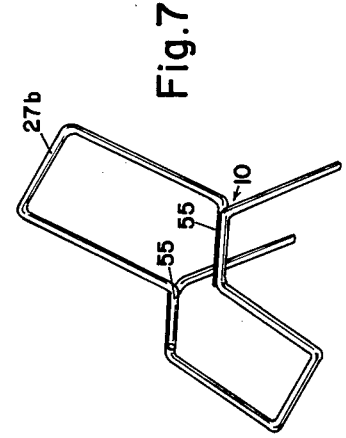
FIGURE 7 is an isometric view of a carriage frame such as is used in FIG. 1, in the middle cart of FIG. 2 and in FIG. 6.

In FIGURE 7 is shown a carriage frame suitable for use in place of the frames described above. In this case the tubular handle member 27b is extended into arms 55 which lie parallel beside the top of the tubular carriage frame 10 and are secured thereto by welding or other convenient means.

The third cart in the line being parked in FIG. 2 is one designed for large capacity of large bulk items. To this end, the body is wider than the bodies of the other carts, and the supplemental side members 56 are pivoted on substantially the same hinge axis, and adapted to be engaged, e.g., by the hooks 58 on the upper rear ends of the receptacle walls 14d, when the receptacle is swung from its folded position towards its extended position of use. Flanges 60 inturned at the tops of the side walls 12d engage lugs 61 on members 56 to limit their angular position to that shown in FIG. 2 when the receptacle is extended. Thus, these auxiliary side members 56 come into effective position like the leaves of a fan; and, especially when the receptacle 14d is stopped so as to have a substantial upward slope in its position of use and the body 12d has a substantial rearward slope, they provide a hopper-like carrier of ample depth and capacity. For supermarket use, such a cart is particularly useful for large bags and boxes of staples, such as flour, vegetables, soaps, etc.

In FIGURE 8 is shown another embodiment of the invention. In this case, the carriage frame 10e is made of sheet metal, as shown, and secured to the bottom of the body section 12e. A handle 27e is secured to the back of the body section. A shelf 24e is mounted, as shown, in the upper part of the body section 12e, e.g., by spot welding of flanges shown. In order to facilitate more complete nesting, in spite of the shelf 24e, the receptacle 14e is somewhat wider than the body 12e and its sides are external with respect to the body.

The end 47 of the receptacle 14e is mounted by spring hinge 64.

A sliding partition 66 having end flanges 67 fitting against the sides of the receptacle 14e is connected by a pull cord 69 with a knob on its end. The cord 69 runs through a grommet 71 in the bottom of the receptacle 14e so that the ring or knob hangs just beneath the front of the receptacle where it can be grasped by a clerk at the checkout counter and pulled, as shown in FIG. 8, whereupon the sliding partition 66 is pulled forward, gathering the contents of the receptacle and pushing them against the front gate 47. The latter is thus swung down, against the force of the spring hinge 64, and acts as a gangplank while the contents of the receptacle are pushed onto it from the receptacle 14e and across it onto the checkout counter 70. The sliding partition 66 is connected at its rear by a flexible tape 72 to a spring reel 74 on the back of the body 12e.

As shown in FIG. 9, a clerk standing behind the cash register can reach forward, grasp the knob or ring on the end of the cord 69 when a customer has pushed a cart up to the counter 70 and, by pulling the cord, the cart is pulled up against the counter, the end 47 is swung down and the contents of the receptacle are pulled down over the end 47, acting as a gangplank, and onto the counter, thus saving much of the time which is ordinarily consumed by clerks reaching into baskets and picking out items one or two at a time.

When the cart is empty, the clerk releases the cord 69 and the spring reel 74 pulling on the tape 72 pulls back the partition 66 while the spring hinge 64 returns the end 47 to its normal position. The cart is then pushed back to the parking area; and if the area is crowded, an attendant will from time to time push the line of carts together with the legs at one end of frame 10 on each cart extending between the legs of the cart in front of it, as in FIG. 2 and the receptacles 14 folded into or over the bodies 12, as has been described above. If the line of carts is convenient to the entrance, incoming customers will pull off carts from the opposite end of the line, or can separate the line if a different cart not at the end is required.

In general, I have found that it is best to have the angle between the extended receptacle 14 and the body 12 approximately a right angle; but my invention is not limited to that and, in some cases, a larger angle is more desirable, e.g., 120°. If the slope of the bottom of the receptacle 14 is greater, it is sometimes desirable to have baffles or a corrugated bottom so as to reduce chance of articles sliding down the sloping bottom, but ordinarily such sliding as may occur is not objectionable; and, in fact, it facilitates loading of the receptacle if the articles tend to move back against the body 12.

From the above, it will be apparent that the present invention gives a substantial improvement over the shopping carts heretofore available. By this invention, the limitations which have heretofore existed from the necessity of nesting the receptacles one into the other are eliminated, and the design of the cart can be controlled to a much greater extent by the desired appearance of the carts and the decor of the store where they are to be used. The size and capacity of these carts are independent of others which may be used in the same room and parked with them; it is possible to have a variety of carts adapted respectively for requirements of different customers, i.e. some for carrying large packages of bulk goods, some for carrying small packages or canned goods, etc.; some for the mothers of infants who must carry them on the carts; some for those who prefer a smaller cart to carry a modest order of groceries, and larger carts for the housewife with a big family, etc.

Because the receptacles do not have to nest, they can be rectangular and, therefore, have greater capacity than the nesting receptacles now used. Because there is no tightly nesting part, there is no tendency of the carts to jam together when they are parked compactly in a line. These special advantages are secured without impairing any of the advantages which one would have with the carts as heretofore used.

If desired, a friction hinge may be used at 15 and likewise at 37 to avoid crashing down of the receptacle or the shelf when the cart is unfolded but, ordinarily, this will not be necessary.

Where the automatic unloading of FIGS. 8 and 9 is not desired, the height of the receptacle will ordinarily be such that its sides are at about the same height as the level of the checkout counter, so that the checkout clerk can easily reach over into the basket and unload it onto the counter.

Instead of the cross strip 66 and side wings 67 for the self-unloader in a receptacle 14e with sides and drop end 47, as shown in FIG. 8, the self-unloader member may be a complete rectangle, i.e., four walls, open top and bottom and slidably mounted on the receptacle member 14 with or without side walls. If side walls are not provided, in-turned flanges may be used to engage an outwardly extending flange on the bottom of the unloader member so as to keep it slidably secured to the member 14.

A shelf 24, 24e and/or 32, and the like, provides for segregation of heavy items, such as canned goods and bottled goods, etc., from crushable items, such as eggs, lettuce, tomatoes, fruit, etc., the latter being put, when selected, onto the higher shelf, whereas the heavier items are put into the receptacle without danger of crushing the more delicate items.

In order to protect the cart against overloading, for example, by carrying heavier children on the front end of the receptacle, the front wheels 16 may be positioned far enough back relative to the receptacle 14 so that the cart will tip forward before the safe limit of loading is reached.

Any suitable shock absorber device may be used with the receptacles 14 and/or shelves 24, in order to avoid excessive noise and shock to the parts when these are dropped down to its extended position.

Springs can be added, if desired, to bias the receptacle toward the open position. These, of course, should not be so strong as to push the carts apart when they have been pushed together in compact parking arrangement, or latches may be provided to hold the receptacles open, but release when subjected to a slight horizontal push for parking.

Permanent identification can be displayed on the sides of the body portion, or on the sides of the receptacle, especially as to carts which are designed for carrying home purchases from a store. Such identification can, for example, announce that the cart has been loaned by a given store, giving prominent display of the store's name, or it can advertise current bargains at the store.

Conventional guards and bumpers and low shelves above the caster level can be added, if desired.

In this specification and the accompanying drawings I have shown and described a preferred embodiment of my invention and various modifications thereof; but it is to be understood that these are not intended to be exhaustive or limiting of the invention but, on the contrary, are given for purposes of illustration in order that others skilled in the art may fully understand the invention and the principles thereof and the manner of applying it in practical use so that they may modify and adapt it in various forms, each as may be best suited to the conditions of a particular use.

I claim:

1. A cart having a frame with front and rear stanchions spaced so that the stanchions of one cart can be pushed under, and between the stanchions of another like cart; a forwardly projecting receptacle open at one side and closed at the opposite side and hingedly mounted on the frame with its hinge axis low with respect to its forwardly projecting end, whereby a horizontal force against said end produces a moment about said hinge axis which tends to lift said end, and said axis being at the rear portion of the receptacle whereby the weight of a load in the receptacle will produce a moment tending to hold the receptacle down; stop means adapted to limit downward movement of the receptacle to a position in which its open side is upward and its closed side is at the bottom to provide a floor; and the back of said cart providing an abutment slide extending rearwardly of the cart at an angle to the vertical less than the angle complementary to the angle the upwardly sloping receptacle makes with the horizontal when it is down against said stop means, whereby when one such cart is pushed empty against another, front to back, the end of its receptacle will ride up along the abutment slide at the back of the other cart until the receptacle is in an upright position for space economy in parking.

2. A cart as defined in claim 1, which further comprises a hollow upstanding body open at its forward side and into which said receptacle is nested when it is swung up.

3. A cart as defined in claim 2 in which the back of the body constitutes said abutment slide.

4. A cart as defined in claim 2, which further comprises a shelf on said hollow body at its open side and narrower than said receptacle whereby the shelf may project into the receptacle when it is folded up.

5. A cart as defined in claim 2, which further comprises a shelf hinged to the body above said receptacle and having an outer end projecting so as to overlie the side walls of the receptacle when both are down, whereby, when the receptacle is swung up, it catches and pushes the shelf ahead of it.

6. A cart as defined in claim 2, in which the body has spaced openings in the upper part of its back and a shelf in said body at the bottom of said openings, and a bar above said openings, whereby a child can be seated on said shelf with legs hanging out through said opening and hands holding onto said bar and facing a person pushing the cart.

7. A cart as defined in claim 6, in which a gate is hingedly mounted at the forward edge of said shelf and adapted to swing upwardly to provide a back rest when it is being used as a baby seat and swing downwardly over the shelf when not in use to at least partially close the leg openings.

8. A cart as defined in claim 7, in which the gate is an angle strip comprising a flat plate hinged at its forward edge at the level of said shelf and having an angularly extending web at its rearward edge so that when folded down it lies flat on said shelf with its angular web upstanding therefrom and lying against the back of the body to at least partially close the leg openings.

9. A cart as defined in claim 2, which further comprises fan strips pivoted on said hinged mounting between the receptacle and the body at each side thereof to fan out when the receptacle is swung down and means for limiting pivotal movement of said strips relative to each other, to the receptacle and to the body, thereby to provide a supplemental side wall to effectively extend the receptacle walls.

10. A cart as defined in claim 1, in which the outer end is at an obtuse angle to the bottom of the receptacle.

11. A cart as defined in claim 1, in which a retractable end wall is provided which extends across the space between the ends of the side walls of the forwardly projecting receptacle and is pivoted to swing into and out of the end of the receptacle on an axis parallel to the pivotal axis of the said receptacle, whereby, the retractable end of the receptacle may be swung upwardly to close the front end of the receptacle and downwardly to open the end of the receptacle and form continuation of the floor thereof.

12. A cart having a frame with front and rear stanchions spaced so that the stanchions of one cart can be pushed under, and between the stanchions of, another like cart; a forwardly projecting receptacle open at one side and closed at the opposite side and hingedly mounted on the frame with its hinge axis low with respect to its forwardly projecting end, whereby a horizontal force against said end produces a moment about said hinge axis which tends to lift said end, and said axis being at the rear portion of the receptacle whereby the weight of a load in the receptacle will produce a moment tending to hold the receptacle down; stop means adapted to limit downward movement of the receptacle to a position in which its open side is upward and its closed side is at the bottom to provide a floor; and the back of said cart providing an abutment slide extending at a forwardly directed acute angle to a line through the forwardly projecting end of the receptacle and hinge axis when the receptacle is down against said stop means, whereby when one such cart is pushed empty against another, front to back, the end of its receptacle will ride up along the abutment slide at the back of the other cart until the receptacle is in an upright position for space economy in parking.

References Cited in the file of this patent

UNITED STATES PATENTS

| | | |
|---|---|---|
| 2,572,780 | Tackenberg | Oct. 23, 1951 |
| 2,590,285 | Wiltshire | Mar. 25, 1952 |
| 2,596,686 | Hess | May 13, 1952 |
| 2,596,775 | Kasper | May 13, 1952 |
| 2,615,726 | Brottman | Oct. 28, 1952 |
| 2,672,218 | Genung | Mar. 16, 1954 |
| 2,727,750 | Noll | Dec. 20, 1955 |
| 2,958,536 | Young | Nov. 1, 1960 |